United States Patent [19]

Barkhuus et al.

[11] 4,223,614
[45] Sep. 23, 1980

[54] PLANT FOR THE TREATMENT OF WASTE

[75] Inventors: Per W. Barkhuus, Chesalles sur Oron, Switzerland; Inge Faldt, Bjuv, Sweden

[73] Assignee: Gotaverken Oresundsvarvet AB, Landskrona, Sweden

[21] Appl. No.: 57,902

[22] Filed: Jul. 16, 1979

[30] Foreign Application Priority Data

Jul. 17, 1978 [CH] Switzerland .................. 7695/78

[51] Int. Cl.³ .................. F23G 7/04; F23J 15/00
[52] U.S. Cl. .................. 110/238; 110/215; 55/223; 55/228; 55/259
[58] Field of Search .......... 55/223, 228, 238, 259, 55/350; 210/63 R, 71; 110/210, 211, 215, 216, 238, 259

[56] References Cited

U.S. PATENT DOCUMENTS

| | | | |
|---|---|---|---|
| 3,668,833 | 6/1972 | Cahill | 110/215 |
| 3,716,967 | 2/1973 | Doyle | 110/216 |
| 3,884,162 | 5/1975 | Schuster | 110/216 |
| 4,013,455 | 3/1977 | Kleebees et al. | 55/228 |
| 4,152,123 | 5/1979 | Hegemann | 55/228 |

Primary Examiner—Ernest G. Therkorn
Attorney, Agent, or Firm—Anthony J. Casella

[57] ABSTRACT

A plant comprising a post combustion chamber (1) connected to the combustion chamber of a household rubbish incineration furnace whose hot gases it uses in order, by means of suitable burners (2, 3), to heat sewage sludges and industrial liquids and a circuit for the treatment of the smoke and residues coming from said post combustion.

This circuit, which is held under vacuum by a blower (27), comprises a dry cooling tower (7) employing semi-liquid sludges as cooling agent, an absorption tower (15) employing a solution adapted to combine the predominantly acid gases of the smoke, and a separating tower (22) in which the liquids in suspension are removed.

A recycle circuit (190) for the solution and liquid separated and means of recovering metallic particles and compounds (10, 12, 29) complete this plant.

6 Claims, 1 Drawing Figure

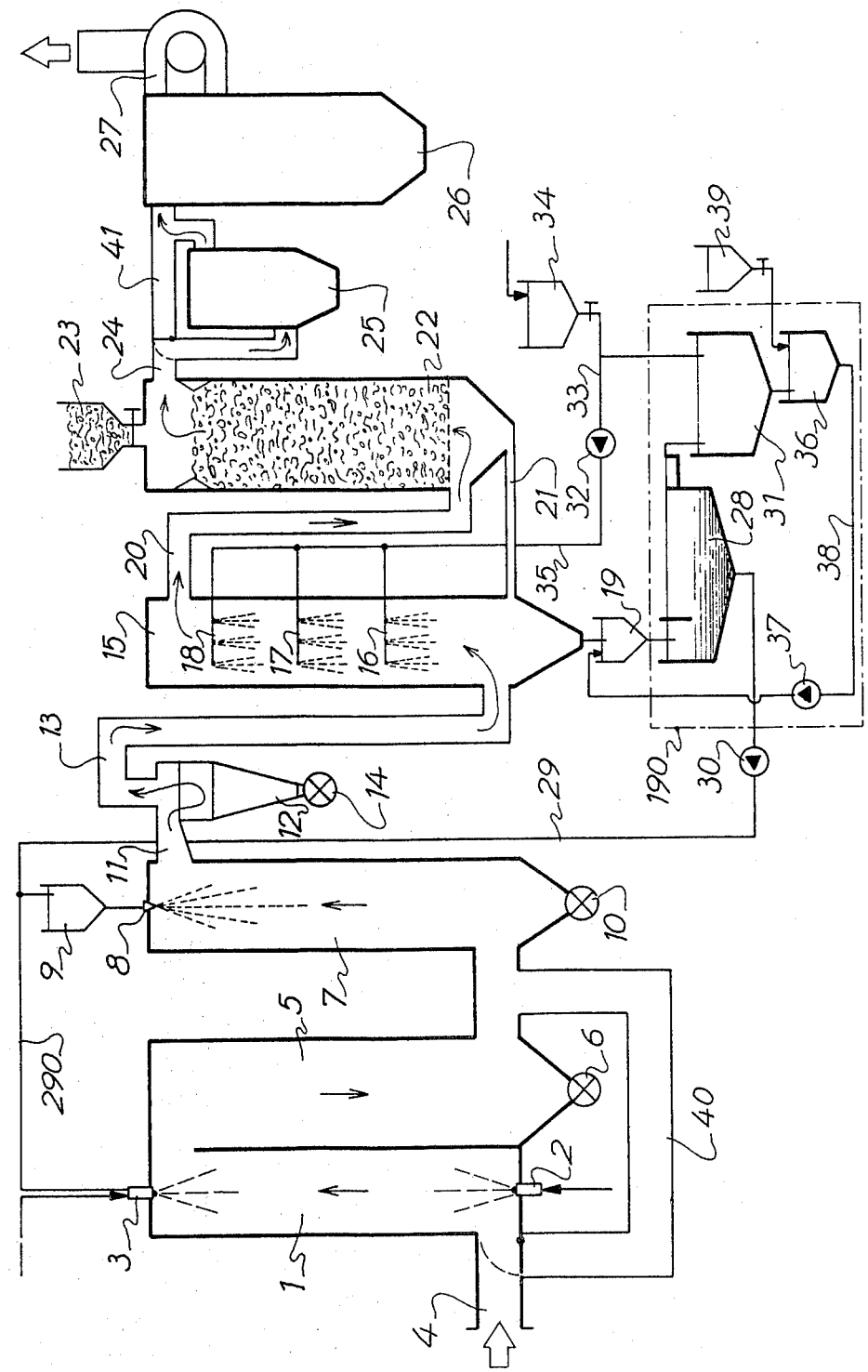

PLANT FOR THE TREATMENT OF WASTE

The object of the present invention is a plant for the treatment of waste which is intended to solve certain technical and economic problems raised by the elimination of the smoke liberated by household rubbish incineration furnaces and by the purification and elimination of slightly contaminated industrial liquors and sewage sludges.

At present, the smoke given off by household rubbish incineration furnaces is cooled and then eliminated in annexed installations comprising fragile and expensive electrofilters which poorly withstand the chlorinated compounds resulting from the combustion of plastics, which have the effect of corroding them rapidly.

Slightly contaminated industrial liquids, such as for instance liquors of the galvanic industries, spent solvents and resinous residues cannot be treated in purification stations since their degree of contamination is still too high for this type of treatment. Therefore, these industrial liquids must be stored and then transported for destruction after having undergone prior lengthy and complicated filtration and settling.

Finally, the liquid or semi-liquid sewage sludges which are normally treated in the purification stations rapidly clog the latter and thereby result in the necessity of effecting frequent cleaning.

The plant defined in Claim 1 provides the solution for these problems by the fact that it combines in a single operating cycle the treatment of industrial liquids and of sewage sludges and the treatment of the smoke coming from the combustion of both this waste and of rubbish burned in the incineration furnace with which it is associated, doing so in an economical manner, without the contribution of expensive external energy, the energy being provided by the hot gases coming from this furnace.

The accompanying drawing shows, by way of example, one embodiment of the object of the invention.

The sole FIGURE of this drawing is a diagrammatic overall view.

The plant shown comprises:

A post-combustion chamber 1 equipped with two burners 2 and 3, arranged vertically opposite each other with an inlet 4 intended to be connected to the combustion chamber of a household rubbish incineration furnace of any existing known type (not shown) in order to recover the hot combustion gases directly therefrom via this inlet 4.

An expansion conduit 5 following and communicating with the post-combustion chamber 1 and equipped with a conical bottom with discharge valve 6.

A dry cooling tower 7 connected to the expansion conduit 5 and equipped with an inlet 8 communicating with a feed vat 9, with a conical bottom with discharge valve 10 and with an outlet conduit 11.

A centrifugal separator 12 connected to the cooling tower 7 and equipped with an outlet conduit 13 and with a conical receptacle with discharge valve 14.

A wet cooling and absorption tower 15 connected to the centrifugal separator 12 by the conduit 13 and equipped with injectors 16, 17 and 18, with a conical bottom which discharges into a receptable 19, with an evacuation conduit 20, and with a connecting conduit 21.

A treatment and cooling liquid feed and recycle circuit 190.

A separating tower 22 connected to the absorption tower 15 by the conduits 20 and 21 and equipped with a feed container 23 and with an outlet conduit 24.

An absorber 25 connected to the separation tower 22 by the conduit 24.

A filter device 26.

A blower 27.

This equipment, which forms a treatment circuit, has the following characteristics:

The two burners 2 and 3 of the post-combustion chamber 1 are of a type capable of treating liquid, gaseous or pasty residues, such as for instance the high-frequency burner described in Swiss Patent No. 579 238. Waste of high heating power such as, for instance, spent solvents and resinous residues is injected into the lower burner 2 and waste which on the other hand requires a large contribution of heat such as, for instance, sewage muds laden with metallic hydroxides, silt, and mud is injected into the upper burner 3. Under the effect of the hot gases introduced into this chamber via the inlet 4 and which normally reach 1100° to 1200° C., this waste ignites by itself, burns and then passes through the chamber 5 at the bottom of which the heavy metallic residues and compounds coming from their combustion, such as slags and clinkers accumulate and are evacuated through the outlet valve 6.

In order to obtain a good mass transfer between the waste introduced into the post-combustion chamber and the combustion air, said chamber is arranged preferably vertically, as shown in the drawing, in such a manner as to produce a turbulent flow and a sufficiently long average holding time, for instance on the order of two seconds. This effect, combined with the temperature of the hot gases introduced of 1100° to 1200° C. assures the decomposition of the most harmful organic waste, such as dichlorodiphenyl trichlorethane.

The use of two burners arranged opposite each other and fed with waste of different heating powers is advantageous since this arrangement makes it possible to regulate the temperature of the post-combustion chamber without the addition of supplementary air, but this arrangement is not indispensable and a single burner can assure adequate operation.

In the dry cooling tower 7 the hot gases are sprayed with semi-liquid sludges which are injected via the inlet 8 and come from the vat 9 into which they have been previously poured. These sludges, used here as cooling agent, will preferably be sewage sludges without appreciable heating value and of low content of harmful heavy metals so that they are potentially reusable, such as for instance muds, silts, and sludges containing metallic hydroxides or other inorganic compounds.

The metallic particles and compounds contained in these sludges are recovered in dried form either via the discharge 10 from said tower 7 for the heavier particles and compounds or via the discharge 14 from the centrifugal separator in the case of the lighter particles and compounds.

Parallel to these semi-liquid sludges, metallic particles and compounds coming from the separation effected in the absorption tower 15 after settling as will be explained further below are injected via the inlet 8 of said tower. These metallic particles and compounds, dried in this cooling tower 7, are also recovered at the outlets 10 and 14 mentioned above.

In the absorption tower 15, the gases which are still hot are again cooled by spent solutions, introduced, in the example described, on three levels via injectors 16, 17, 18, before being dried in the separation tower 22. These spent cooling solutions prior to their injection are conditioned as a function of their origin, for instance by oxidation and hydrolysis in order to eliminate the cyanide or deadly elements. Their second mission is to act as absorbent for the predominantly acid gases, such as for instance the sulfurous anhydride or the nitrogen oxides formed upon the primary incineration and combustion of the sewage sludges.

These solutions, acting as coolant and absorbent, are maintained constantly in suitable condition in a feed and recycle device 190 coming from a container 34 into which there are introduced appropriate reagents, depending on the acidity of the gases emitted, primarily sodium hydroxide, lime waters or other spent solutions of alkaline content. Depending on the pH of the cooling agent, most of the heavy metallic compounds are precipitated as their hydroxides.

At the bottom of the absorption tower 15, this solution is recovered in the receptacle 19, which stabilizes its flow, and it is recycled in the circuit 190, in which it is first of all introduced into a settling tank 28; at the bottom of this tank the metallic particles and compounds contained in the recovered solution accumulate whereupon these wet particles and compounds are directed via a conduit 29 equipped with a first pump 30 into the vat 9 where they are mixed with the sewage sludges for their recovery in dry form, as explained previously, or else into the post-combustion chamber 1 via the extension 290 of the conduit 29 for their removal or else as additional contribution.

This solution, which has been clarified in the settling tank 28 overflows into a distribution tank 31 after which it is pumped by a second pump 32 through a conduit 33 also connected to the container 34 which is fed with solution. The resultant solution constitutes the feed of the injectors 16, 17 and 18 to which it is transferred from the pump 33 via a conduit 35.

The residual metallic particles and compounds still suspended in the distribution tank 31 are carried along at the bottom of the latter by a continuous flow into a final receptacle 36, after which they are taken up by a third pump 3 and reintegrated via a conduit 38 in the receptacle 19 for drying and recovery in the cooling tower 7.

In this way all risk of external pollution by the recovered metals is avoided, the circuit 190 in which they are cooled and settled being a closed circuit. In this way also the solution is continuously reused and renewed after settling and clarification.

In case of need, an addition of dilution liquid in the last receptacle 36 can be effected from a container 39 provided for this purpose.

The gases cooled and freed of their metallic particles and compounds in the tower 15 are directed via the conduit 20 into the separation tower 22 in which all the drops of liquid contained in these gases are removed. For this purpose, this tower can be filled with coarse pieces of limestone which, furthermore, have the advantage of reducing the residual amount of HCl and SO₂ still possibly contained in these gases.

Via the bottom conduit 21 the condensates are recycled by the circuit 190 into which they flow via the bottom of the tower 15, so that no liquid leaves the plant.

The absorber 25 contains wood bark which eliminates the malodorous components of the gases which, dried in the separation tower 22 and deodorized in this absorber 25 are finally filtered in the filtration device 26 and then released through the blower 27.

This blower 27 has the additional important effect of maintaining a vaccum throughout the gas treatment circuit of the plant so that any possible leak of gases is avoided at the discharge outlets 6, 10 and 14 of this circuit.

Finally, two safety bypass conduits are provided, one 40 connecting the inlet 4 of the post combustion chamber 1 to the cooling tower 7, and the other 41 connecting the separation tower 22 to the filtering device 26.

This filtering device 26 may be of any nature whatsoever but the fact that the gases emerging from the separating tower 22 are dried, cooled and freed of their harmful particles affords the advantage of permitting the use of a filtering device known as a "tube filter," which constitutes a simple and economical solution.

Furthermore, the gases are already sufficiently purified upon emergence from said separating tower 22 to permit their release at this level and thus avoid the addition of the absorber 25 and of the filtering device 26, the vacuumizing device 27 being in this case directly connected to the outlet conduit 24 of the separating tower 22.

We claim:

1. A waste treatment plant characterized by the fact that it comprises a post-combustion chamber (1) equipped with an inlet (4) intended to be connected to the combustion chamber of a household rubbish incineration chamber and with at least one burner (2) adapted to treat the gaseous and pasty liquids contained in the sewage sludges and industrial liquids, in which post-combustion chamber (1) these wastes are injected into the burner and ignited by the hot gases coming from the combustion chamber to which it is connected and a treatment circuit for smoke and residues coming from said post-combustion chamber comprising, sequentially a dry cooling tower (7) into which sewage sludges without appreciable heating power are injected, a wet cooling and absorption tower (15) into which there is introduced a cooling solution adapted to absorb the predominantly acid gases contained in the said smoke and residues and to which there is connected a recycling circuit (190) for said solution, a separation tower (22) in which the liquids in suspension are separated and directed for recycling to the recycling circuit (190), and a device (27) for placing the smoke and residue treatment circuit under vacuum.

2. A plant according to claim 1, in which the post-combustion chamber (1) is equipped with two burners (2 and 3), characterized by the fact that these two burners are arranged vertically opposite each other, that one of them is fed with waste of high heating power while the other is fed with waste which requires a high contribution of heat, so that a turbulence and a stay of said waste are obtained in said chamber.

3. A plant according to claim 1, characterized by the fact that it comprises a centrifugal separator (12) with discharge (14) mounted on the portion of the smoke treatment circuit connecting the dry cooling tower (7) to the wet cooling and absorption tower (15) separating and delivering the light metallic compounds and particles contained in the sludges dried in said tower while the latter has a discharge (10) which delivers the heavy metallic compounds and particles.

4. A plant according to claim 1, characterized by the fact that the recycle circuit (190) comprises, connected to and arranged one behind the other, a settling tank

(28) on the bottom of which there accumulate the metallic particles and compounds contained in the recovered solution, a distribution tank (31) for the solution clarified in the settling tank (28), a receptacle (36) into which the solution charged with residual metallic particles and compounds continuously discharges, a conduit (38) equipped with a pump (37) connecting said receptacle to the settling tank (28), a conduit (33) equipped with a pump (32) connecting the distribution tank (31) to the feed (16 to 18) of the absorption tower (15) on which conduit there is also connected a container (34) in which the solution is prepared so that the solution is continuously reused and renewed after settling and clarification.

5. A plant according to claims 1, 3 or 4, characterized by the fact that it comprises a conduit (29) equipped with a pump (30) connecting the bottom of the settling tank (28) of the recycle circuit (190) to the feed vat (9) of the dry cooling tower (7) so that the metallic particles and compounds contained in the solution and deposited at the bottom of said tank are dried in said dry cooling tower (7) and recovered by the discharges (10 and 14) from said tower and from the centrifugal separator (12).

6. A plant according to claim 1, comprising a smoke filter arranged on the portion of the smoke treatment circuit which connects the separation tower (22) to the vacuumizing device (27), characterized by the fact that said filter (26) is a tube filter.

* * * * *

UNITED STATES PATENT AND TRADEMARK OFFICE
CERTIFICATE OF CORRECTION

PATENT NO. : 4,223,614

DATED : September 23, 1980

INVENTOR(S) : Per W. Barkhuus et al.

It is certified that error appears in the above—identified patent and that said Letters Patent is hereby corrected as shown below:

On the title page, the designation of the Assignee should read as follows:

-- Gotaverken Oresundsvarvet AB, Landskrona, Sweden a part interest --.

Signed and Sealed this

Third Day of February 1981

[SEAL]

Attest:

Attesting Officer

RENE D. TEGTMEYER

Acting Commissioner of Patents and Trademarks